United States Patent
Altmann et al.

(10) Patent No.: US 6,827,885 B2
(45) Date of Patent: Dec. 7, 2004

(54) METHODS AND DEVICES TO CONTROL POLYMERIZATION

(75) Inventors: Griffith E. Altmann, Webster, NY (US); Lisa A. Armstrong, Webster, NY (US); Kevin D. Beebe, Spencerport, NY (US); Ian G. Cox, Mendon, NY (US); Horngyih Huang, Penfield, NY (US); Michael A. Lesczynski, Honeoye Falls, NY (US); Arthur W. Martin, Poughkeepsie, NY (US); Michelle L. Moran, Fairport, NY (US); Joseph Papalia, Webster, NY (US); Dominic V. Ruscio, Webster, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 577 days.

(21) Appl. No.: 09/818,919

(22) Filed: Mar. 27, 2001

(65) Prior Publication Data

US 2002/0000680 A1 Jan. 3, 2002

Related U.S. Application Data

(60) Provisional application No. 60/193,904, filed on Mar. 31, 2000.

(51) Int. Cl.[7] .............................................. B29D 11/00
(52) U.S. Cl. .................................... 264/1.36; 264/1.38
(58) Field of Search .............................. 264/1.36, 1.38, 264/2.5; 425/808, 174.4

(56) References Cited

U.S. PATENT DOCUMENTS

| | | | |
|---|---|---|---|
| 4,113,224 A | * 9/1978 | Clark et al. | .................. 249/105 |
| 4,166,088 A | 8/1979 | Neefe | ............................. 264/1 |
| 4,534,915 A | 8/1985 | Neefe | ......................... 264/1.4 |
| 4,879,318 A | 11/1989 | Lipscomb | .................... 522/42 |
| 4,919,850 A | 4/1990 | Blum | ........................ 264/1.4 |
| 4,988,274 A | 1/1991 | Kenmochi | ............... 425/174.4 |
| 5,039,459 A | 8/1991 | Kindt-Larsen et al. | ....... 264/2.6 |
| 5,070,215 A | 12/1991 | Bambury | .................... 556/418 |

(List continued on next page.)

FOREIGN PATENT DOCUMENTS

| EP | 0640649 A1 | 3/1995 | ........... C08L/23/10 |
|---|---|---|---|
| EP | 0686483 A2 | 12/1995 | ........... B29D/11/00 |
| GB | 2227969 A | 8/1990 | ........... B29C/35/08 |
| JP | 08244128 | 9/1996 | ........... B29D/11/00 |
| WO | 90/05629 | 5/1990 | ........... B29D/11/00 |

OTHER PUBLICATIONS

USSN 09/260860 Entitled "Method of Molding Contact Lenses" filed Mar. 1, 1999 by D. Ruscio.
USSN 09/312105 Entitled "Method and Mold for Casting Contact Lenses" filed May 14, 1999 by D. Ruscio et al.
USSN 09/783433 Entitled "Method and Device to Control Polymerization" filed Feb. 14, 2001 by M. Ayyagari.
USSN 09/797328 Entitled "Method and Mold to Control Optical Device Polymerization" filed Mar. 1, 2001 by G. Altmann.

Primary Examiner—Mathieu D. Vargot
(74) Attorney, Agent, or Firm—Katherine McGuire

(57) ABSTRACT

A method and mold assembly to control the polymerization of a molded article. In one embodiment, an amorphous posterior mold comprising a non-critical surface having a controlled radius of curvature is used to produce molded articles. In an alternate embodiment, ophthalmic lenses are produced using a posterior mold in which the concave surface of the non-critical surface is filled with a liquid having a similar refractive index as the mold material. In still another embodiment, a positive lens is placed at a predetermined distance adjacent to the mold assembly to alter the irradiation path to the mold assembly. In still another embodiment, a positive lens is placed within the concave surface of the posterior lens.

23 Claims, 7 Drawing Sheets

U.S. PATENT DOCUMENTS

| | | | |
|---|---|---|---|
| 5,135,685 A | 8/1992 | Masuhara | 264/22 |
| 5,154,861 A | 10/1992 | McBrierty | 264/1.4 |
| 5,269,867 A | 12/1993 | Arai | 156/275.5 |
| 5,271,875 A | 12/1993 | Appleton | 264/2.3 |
| 5,422,046 A | 6/1995 | Tarshiani | 264/1.38 |
| 5,529,728 A | 6/1996 | Buazza | 264/1.38 |
| 5,610,252 A | 3/1997 | Bambury | 526/279 |
| 5,914,074 A | 6/1999 | Martin | 264/1.38 |
| 5,968,422 A * | 10/1999 | Kennedy | 264/1.1 |
| 5,981,618 A | 11/1999 | Martin | 523/106 |

* cited by examiner

METHODS AND DEVICES TO CONTROL POLYMERIZATION

CROSS-REFERENCE TO RELATED APPLICATIONS

This application claims priority of U.S. Provisional Ser. No. 60/193,904 which was filed Mar. 31, 2000.

BACKGROUND OF THE INVENTION

The present invention is directed toward controlled curing of devices requiring optical cure. More specifically, the present invention provides a method for curing optical devices such that the devices undergo a more controlled polymerization, resulting in a reduction in defects such as dimpling and warpage in the cured device. In particular, the optical devices include ophthalmic lenses including contact lenses, intraocular lenses, spectacle lenses, corneal onlays and corneal inlays. More particularly, this method provides for a method to produce contact lenses having a controlled cure profile.

It is often desirable to mold optical devices such as contact lenses and intraocular lenses, rather than form the lenses by machining operations. In general, molded lenses are formed by depositing a curable liquid such as a polymerizable monomer into a mold cavity, curing the liquid into a solid state, opening the mold cavity and removing the lens. In particular, the mold cavity may be formed by a mold assembly comprised of a posterior mold portion and an anterior mold portion, each having a lens-forming surface. When the posterior mold portion and anterior mold portion are mated, the lens-forming surface of the posterior mold portion and the lens-forming surface of the anterior mold portion form the lens-forming cavity. The non-lens-forming surface of both mold portions, herein referred to as non-critical surfaces, are generally molded to have a similar radius (or radii) of curvature as that of the lens-forming surfaces. While the lens-forming surfaces are of optical quality, each having a central optical zone and typically, at least a peripheral carrier zone, the only requirement of the non-critical surface generally is a smooth surface.

Polymerization is typically carried out by thermal means, irradiation or combinations thereof Traditionally, conventional thermo-casting techniques require fairly long curing times and are used when the resultant object is thick. Rods from which rigid gas permeable lenses are lathed from or thicker lenses are often thermally cured. Curing of lenses by irradiation, in particular, ultraviolet (UV) irradiation, frequently offers short curing times. The monomer is poured into a transparent mold having a desired optical surface, and thereafter the UV light is radiated to the monomer through the transparent mold to cure the photosetting monomer.

A common material used as a mold material is polypropylene, which is disclosed in U.S. Pat. No. 5,271, 875 (Appleton et al., assigned to Bausch & Lomb Incorporated, the entire contents herein incorporated by reference). The process disclosed in Appleton et al., may be used to produce lenses with predictable and repeatable characteristics.

The use of polypropylene may be desired with certain lens-forming materials. Other lens-forming materials, however, may cast just as well or better in other mold materials. As disclosed in U.S. Ser. No. 09/312105 (Ruscio et al. and assigned to Bausch & Lomb Incorporated, the entire contents herein incorporated by reference), polyvinyl chloride absent any UV stabilizer provides a suitable material for the posterior mold.

While the irradiation of the optical device from the light source may be conducted in a uniform and parallel manner, the material chosen for the mold portions may affect the pathways of the light rays. For instance, some materials, such as thermoplastic crystalline polymers, may diffuse the radiation, causing a scattering of the light rays. Polypropylene is such a material. Other materials such as polyvinyl chloride and polystyrene are thermoplastic amorphous polymers, which permit an unhindered pathway for the light rays during curing.

The radiation may also be reflected off the surface of the glass or plastic mold materials. This may result in non-uniform distribution of light intensity over the lens-forming material.

This invention recognized that the non-critical surface of the posterior mold may act as an optical device, reflecting and/or refracting the irradiation in a non-uniform pathway through the mold portion. In particular, the geometry of the non-critical surface of a posterior mold may affect the cure of the lens article sandwiched between the posterior and anterior mold. For instance, the non-critical surface of a posterior mold may be comprised of a radius of curvature and an outer flat portion. The junction formed at the intersection of the radius and flat portion may produce a molding area in which the radiation does not penetrate well. This would be similar to providing a shadow on the lens article. The resultant lens would then have a circular area corresponding to the junction(s) that may not be as completely cured as the rest of the lens. Any junction formed at the intersection of different geometries may produce "shadowing". The geometries need not necessarily be spherical.

Additionally, the non-critical surface of the mold may refract the radiation from the optical source. This may lead to non-uniform curing speed of the ultraviolet curable resin. As a result, since the curing is completed faster and more completely in a portion receiving a high radiation intensity (in this instance, the periphery portion of the lens) and slower in a portion receiving a low irradiation intensity (the central portion, respectively), a stress is generated in the cured resin layer. This stress may deteriorate the precision of the optical device face. Additionally, since the faster curable portion receiving higher radiation intensity is cured with absorption of the surrounding uncured resin in order to compensate for the contraction of resin resulting from curing, the slower curable portion (which receives lower radiation intensity) may show defects such as shrinkage. In particular, in the case of contact lenses and spectacle lenses, this can produce lenses with unacceptable optical aberrations caused by uneven curing and stress. "Dimpling" or warpage of the contact lens is a common problem caused by uneven curing. In dimpling, the apex of the lens is flattened or slightly concave in shape. Warpage is generally seen as the inability of the edge of a lens to have continuous contact with the molding surface upon which it contacts. Other drawbacks seen with plastic spectacle lenses include "striations", which are caused by uneven curing and stress. Thermal gradients form in the gel-state, which produce convection lines ("striations") that become frozen in place and cannot be dispersed.

U.S. Pat. No. 4,166,088 (Neefe) discloses a method of controlling the polymerization of cast optical (plastic or contact) lenses. The mold section on the bottom is a lens which focuses UV light to the center of the cavity. The bottom mold must have a thickness which corresponds to the focal length of the refractive surface so that the UV light rays converge at the center of the monomer being cured. Neefe also requires an aluminum reflector on the outer surface of the top mold to reflect light back through the monomer.

U.S. Pat. No. 4,534,915 (Neefe) discloses the use of a convex positive refractive power cylinder lens to provide a band of actinic light to a rotating lens monomer. The center of the spin cast lens receives the most radiation, the area adjacent to the center receives less while the periphery receives still less radiation. This allows for the outer portion of the spin cast lens to migrate inward as the lens shrinks during the curing process. A fresnel lens or a Maddox rod may also be used to provide the narrow high-energy line of actinic light.

U.S. Pat. No. 4,879,318 (Lipscomb et al.) discloses the use of mold members formed from any suitable material that will permit UV light rays to pass through. To aid in the even distribution of the UV light, the surfaces of the molds are frosted. In one embodiment, a Pyrex glass plate is used to filter out UV light below a certain wavelength. Lipscomb et al. found that if incident UV light is not uniform throughout the lens, visible distortion pattern may appear in the finished lens. Lipscomb et al. solved this problem by including additives in the lens forming composition to reduce the distortions. The ophthalmic lenses are formed from plastic.

U.S. Patent No. 4,919,850 (Blum et al.) discloses a method for making plastic lenses in which the liquid lens material is dispensed into the mold cavity and put into a heated bath for a partial thermal curing. After a period of time, the mold (while still in the liquid bath) is subjected to UV light for an additional period of time. The liquid bath disperses the UV light sufficiently to avoid stresses and other adverse effects on the lens ultimately formed that may be caused by uneven exposure to the UV light. The mold may also be rotated while in the bath or the bath may include an aerator to enhance the dispersion of the UV rays. By rotation of the mold and aeration of the bath, the surface of the mold is also kept free of any debris which may otherwise channel the UV light. Additionally, a reflective surface provided on the one of the molds forms may reflect UV light back through the lens material being cured.

U.S. Patent No. 4,988,274 (Kenmochi) discloses irradiating the central portion of the mold cavity containing the lens-forming material to initiate a photocuring reaction. The area of the light, in the shape of a ring, is enlarged until the lighted area reaches the periphery of the lens-forming material. A variable power lens, including a fresnel lens, may be used to align the light. The lens-forming material in the center of the mold cavity is cured first which causes the lens-forming material around it to shrink. The shrunk volume of lens-forming material is supplemented with additional uncured lens-forming material. The variable power lens allows for adjustment of the ring-shaped light.

U.S. Pat. No. 5,135,685 (Masuhara et al.) discloses the use of a conveyor or other moving device to continuously move objects to be irradiated by a multiplicity of aligned sources of visible light. The movement of the irradiated objects may be linear or curved movement on the same plane or upward or downward movement.

U.S. Pat. No. 5,269,867 (Arai) discloses a method for producing glass lenses with a coating on one side. The coating is a resin layer that is cured with UV light. The resin is dropped onto a metal mold (with a reflective surface) and the glass lens placed on the resin. The resin is interposed between the lens and the metal mold. UV light is provided through the glass lens, curing the resin. A filter may be used to evenly distribute the UV light. Without the filter, the reflection of the metal mold and the glass lens result in non-uniform distribution of UV light and non-uniform curing speed. The center of the resin cures faster than the outer perimeter, causing defects such as shrinkage in the resin.

U.S. Pat. No. 5,529,728 (Buazza et al.,) discloses a method of curing a plastic eyeglass lens. The method comprises placing a liquid polymerizable composition within a mold cavity defined by mold members and a gasket. A first set of UV rays is directed to one of the mold members. The gasket is removed and a second set of UV rays is directed to the lens. Buazza et al., further discloses the use of a filter which includes a plate of Pyrex glass to diffuse the UV light so that it has no sharp intensity discontinuities. To produce a positive lens, the UV light intensity is reduced at the edge portion so that the thicker center portion of the lens polymerizes faster than the thinner edge of the lens. Mold members of Buazza et al., are preferably precision ground glass optical surfaces having UV light transmission characteristics including casting surfaces with no surface aberrations, waves, scratches or other defects.

None of the above art completely solves the problems which occur when using a mold assembly in which one mold portion is made from an amorphous material and acts as an optical device. The resultant lens made from this particular mold assembly may have defects such as dimpling and warpage.

SUMMARY OF THE INVENTION

The present invention is a method for photocuring cast articles such as ophthalmic lenses in which defects in the cured article are reduced. By altering the pathway by which irradiation rays reach the article to be cured, defects can be reduced. By controlling the relative intensity of radiation upon a particular portion of lens-forming material, the rate of polymerization taking place at various portions of the lens can be controlled. This method is particularly suited for use with mold materials which are amorphous.

One embodiment of this invention comprises altering the radiation rays by at least partially neutralizing the optical affects of the non-critical surface through which the rays initially penetrate. This can be accomplished by filling the non-critical surface cavity of the posterior mold with a liquid, such as water or glycerin.

Another embodiment of this invention comprises reshaping or removing any junctions formed between different geometries (e.g. a radius of curvature and flat surface portion) used to form the non-critical surface. The non-critical surface of the posterior mold may then be comprised of a controlled radius of curvature, eliminating any shadows or areas which the irradiation rays may not penetrate evenly. The controlled radius may be spherical or aspherical, provided that the surface is smooth and continuous.

In still another embodiment of this invention, the radiation path from a light source is altered so as to obtain a desired cure profile across the mold cavity. This results in controlled cure gradient across the cast article. The radiation path may be altered in various ways, including the use of an optical element. The optical element may be a positive or negative lens.

In the preferred embodiment, the optical element is a positive lens which is placed at a predetermined distance above the posterior mold. The positive lens converges radiation rays, preferably ultraviolet (UV) radiation, passing through the mold and increases the energy available to the cured article. The distribution of irradiation rays radiates from the center of the mold. This distribution reduces the cure gradient across the lens, which reduces or removes any residual stress induced during curing. The result is a cured article such as a contact lens having an acceptable apex in the central portion of the lens. The positive optical element allows control of the illumination intensity profile reaching various sections of the contact lens. Stress developed by uneven intensity profiles can be removed or introduced.

It is further preferred that the radiation path is altered by use of an aspheric condenser lens such that the light rays passing through the posterior lens mold is distributed radially. The aspheric condensing lens is placed at a certain distance from the mold and preferably has a plano back. The lens may be any lens that focuses light to a certain desired area.

An alternate method of altering the radiation path is placement of an optical element into the non-critical surface cavity of the posterior mold. In particular, the radiation can be altered by placement of a lens in the shape of a plug into the non-critical surface cavity of the posterior mold. Preferably the lens is a solid asymmetric convex lens and the material from which it is formed is amorphous.

The ophthalmic lenses formed from these methods are relatively free from defects such as dimpling and warpage.

DETAILED DESCRIPTION OF THE INVENTION

The present invention is useful for the method of making ophthalmic lenses. Preferred embodiments include the method of making intraocular and contact lenses.

Figure 1:
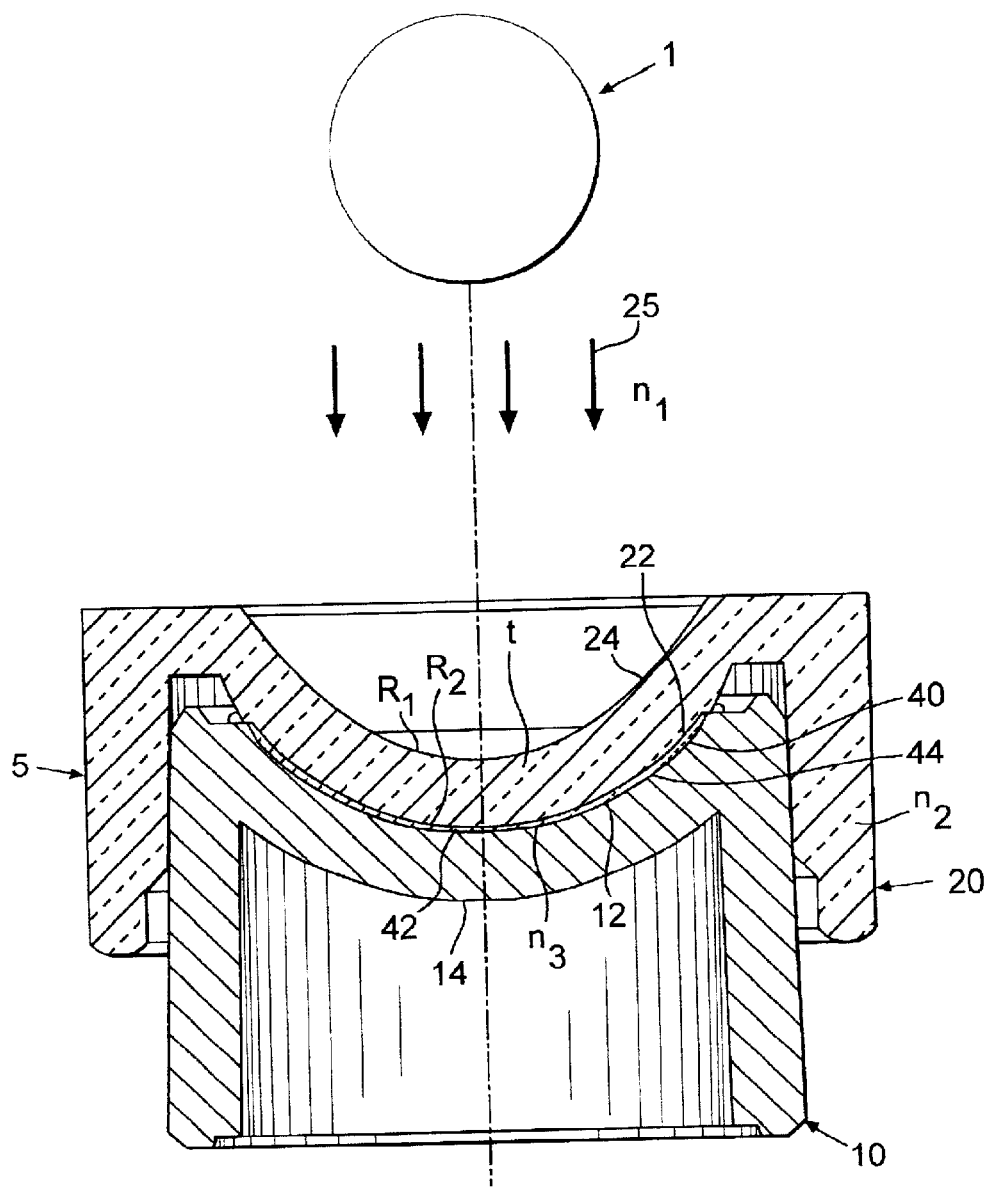
FIG. 1 is a cross-sectional elevational view of a posterior mold section assembled with an anterior mold section.
Figure 2:
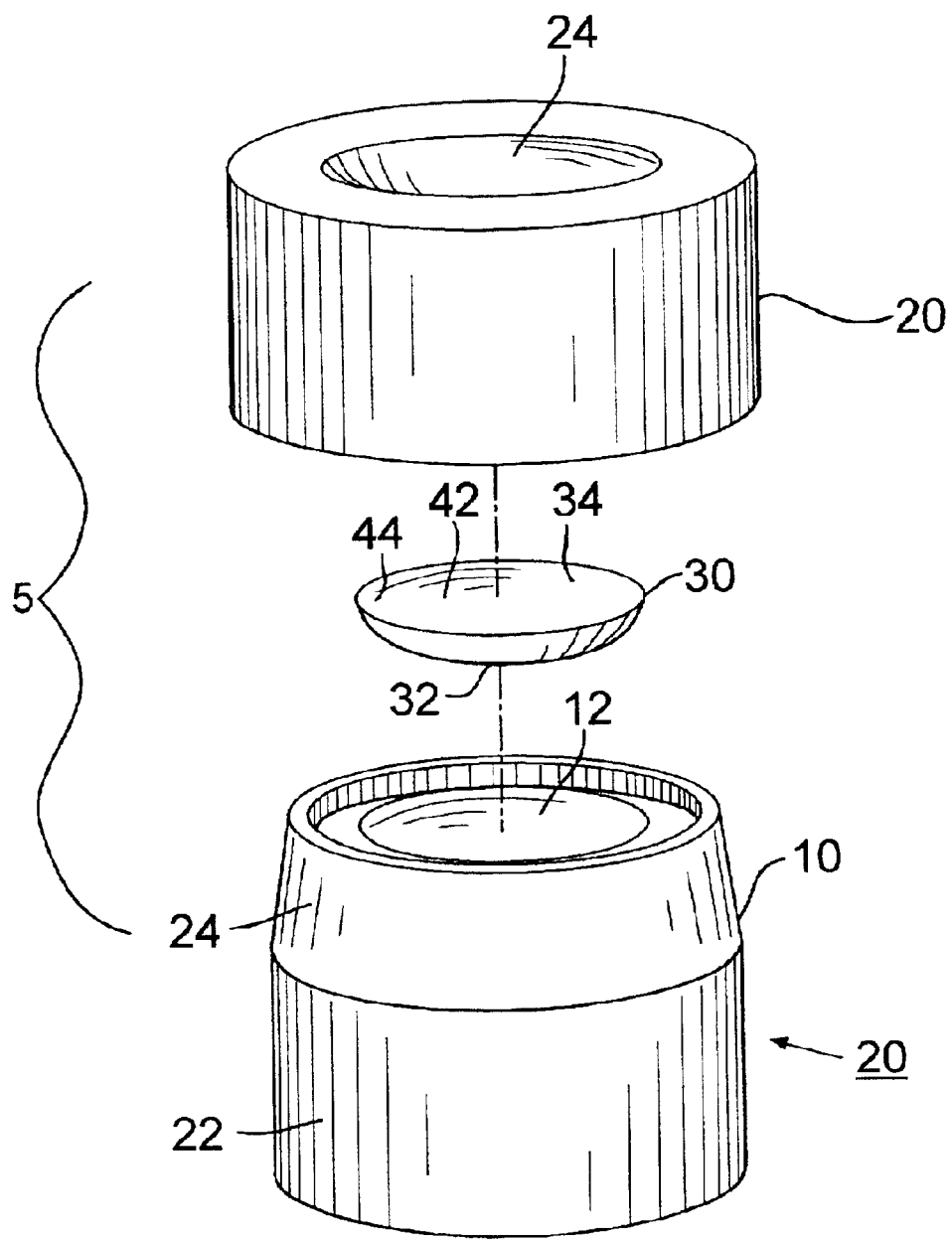
FIG. 2 is a perspective exploded view of a mold assembly including a contact lens.

As seen in FIGS. 1 and 2, mold assembly 5 defines mold cavity 40 for casting lens 30, including anterior mold portion 10 for defining the anterior lens surface 32 and posterior mold portion 20 for defining the posterior lens surface 34. Anterior mold 10 has lens-forming surface (critical surface) 12 and opposing non-critical surface 14. Posterior mold 20 has lens forming surface 22 and opposing non-critical surface 24. When posterior mold section 20 is assembled with an anterior mold section 10, lens-forming cavity 40 is formed between posterior mold section lens forming surface 22 and anterior mold section lens-forming surface 12. As discussed in Appleton et al., lens 30 formed from this mold assembly include a central optical zone 42 and a peripheral carrier zone 44. The peripheral zone 44 has a substantially greater volume than the optical zone 42 and may include a tapered edge.

As illustrated in FIG. 1, rays 25 from optical source 1 irradiate non-critical surface 24 of posterior mold portion 20.

The index of refraction of rays 25 changes as the rays pass through air and then through a solid material.

The preferred material for posterior mold portion 20 is an amorphous material such as polyvinyl chloride (PVC) or polystyrene. Other suitable materials include an amorphous copolymer of ethylene and a cyclic olefin (such as a resin available under the tradename of Topas, from Hoechst Celanese Corporation), standard glasses, synthetic polymers with glass-like properties such as polymethyl methacrylate, polycarbonate, acrylonitrile copolymer (such as resin available under the tradename of Barex), TPX (poly-4-methyl 1-pentene) and polyacrylonitrile. Accordingly, it is preferred that anterior mold 10 is amorphous although other crystalline thermoplastic material such as polypropylene may be used.

The optical or radiation source may be actinic, electron beam, laser or radioactive source, but is preferably ultraviolet lamps which irradiates the monomer. Visible light or infra-red light may also be used. Radiation may also be from a high intensity UV source. Additionally, combinations of light irradiation and thermal means may be used. Unless specified, the term "light" or "rays" will refer to any actinic wavelength or range of wavelengths.

Posterior mold 20 can further be described by its optical parameters. In particular, based on the parameters of a posterior mold used to produce commercially available lenses but using an amorphous material such as PVC, one can calculate the powers of each surface of the mold: non-critical surface radius −6.0 mm ($R_1$), critical surface radius of −8.0 mm ($R_2$), index of refraction of PVC mold material 1.5 ($n_2$), index of refraction of air 1.0 ($n_1$), center of thickness of the mold 2.0 mm (t) and index of refraction of lens-forming monomer of 1.4 ($n_3$). While HEMA (2-hydroxyethylmethacrylate) is a preferred monomer, any lens-forming polymerizable material may be used. Especially preferred are materials that are capable of free radical polymerization. Preferred materials include silicone and methacrylate hydrogels. Preferred examples of applicable materials are disclosed in U.S. Pat. Nos. 5,610,252 and 5,070,215 (Bambury et al., assigned to Bausch & Lomb Incorporated, the entire contents herewith incorporated by reference).

The posterior mold is a negative lens with essentially all of its negative power coming from the non-critical surface. The negative power of the mold causes incident UV rays to diverge as they pass through the mold which leads to a reduction in intensity at the center of the lens-forming cavity. The power of the posterior mold can be described by the following equations:

Power of non-critical surface:

$$\phi_1 = (n_2 - n_1)/R_1 = -83.333D$$

Power of critical surface:

$$\phi_2 = (n_3 - n_2)/R_2 = +12.5000D$$

The total power ($\Phi$) of the mold is:

$$\Phi = \phi_1 + \phi_2 - (t/n_2)\phi_1\phi_2 = -69.444D$$

Figure 3:
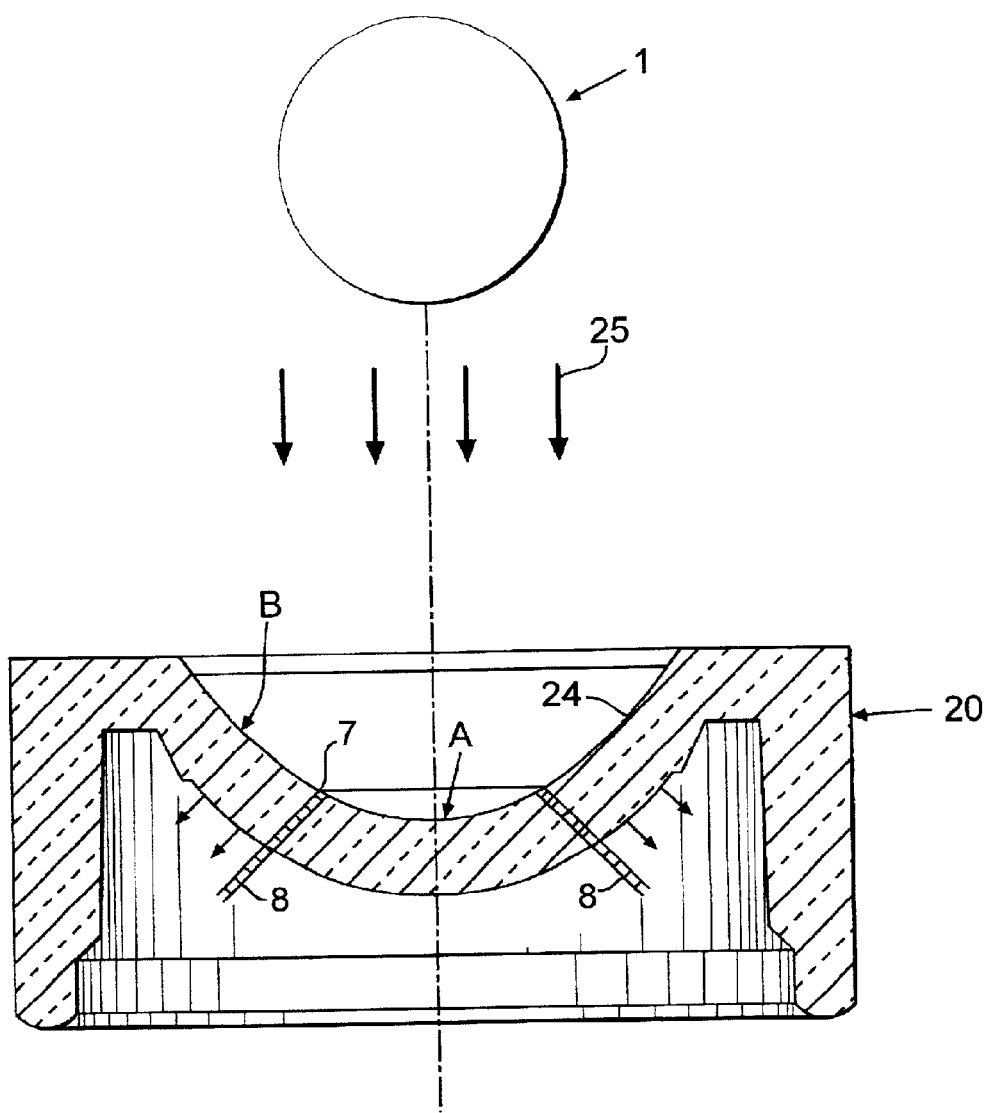
FIG. 3 is a cross-sectional elevational view of a posterior mold section showing light diffusion through the mold section.

Non-critical surface 24 of posterior mold 20 is typically spherical with a radius of curvature that is concentric with equivalent radii of lens-forming surface 22. This keeps the thickness relatively constant across the posterior mold. This concentric requirement forces posterior mold 20, especially when posterior mold 20 is an amorphous material, to be a substantially negative lens. As illustrated in FIG. 3, rays 25 passing through non-critical surface 24 of posterior mold 20 are refracted outward, away from the center optical portion and toward the peripheral carrier zone of the lens (not shown) being cured. This may result in an uncontrolled curing profile of the lens, i.e., one portion of the lens may cure faster or more completely than another portion. Often lenses with uncontrolled cure profiles are warped or demonstrate dimpling.

FIG. 3 also illustrates another cause of uncontrolled cure profiles. It is common for non-critical surface 24 to be comprised of at least two radii of curvature. As seen in FIG. 3, junction 7 is formed at the intersections of portion A and portion B. Portion A defines radius $R_a$. Rays 25 from optical source 1 are blocked by junction 7 from passing through mold 5. This shadow is indicated by darkened area 8. This results in a circular ring of lens-forming material that is not as fully cured as areas outside area 8.

Figure 4:
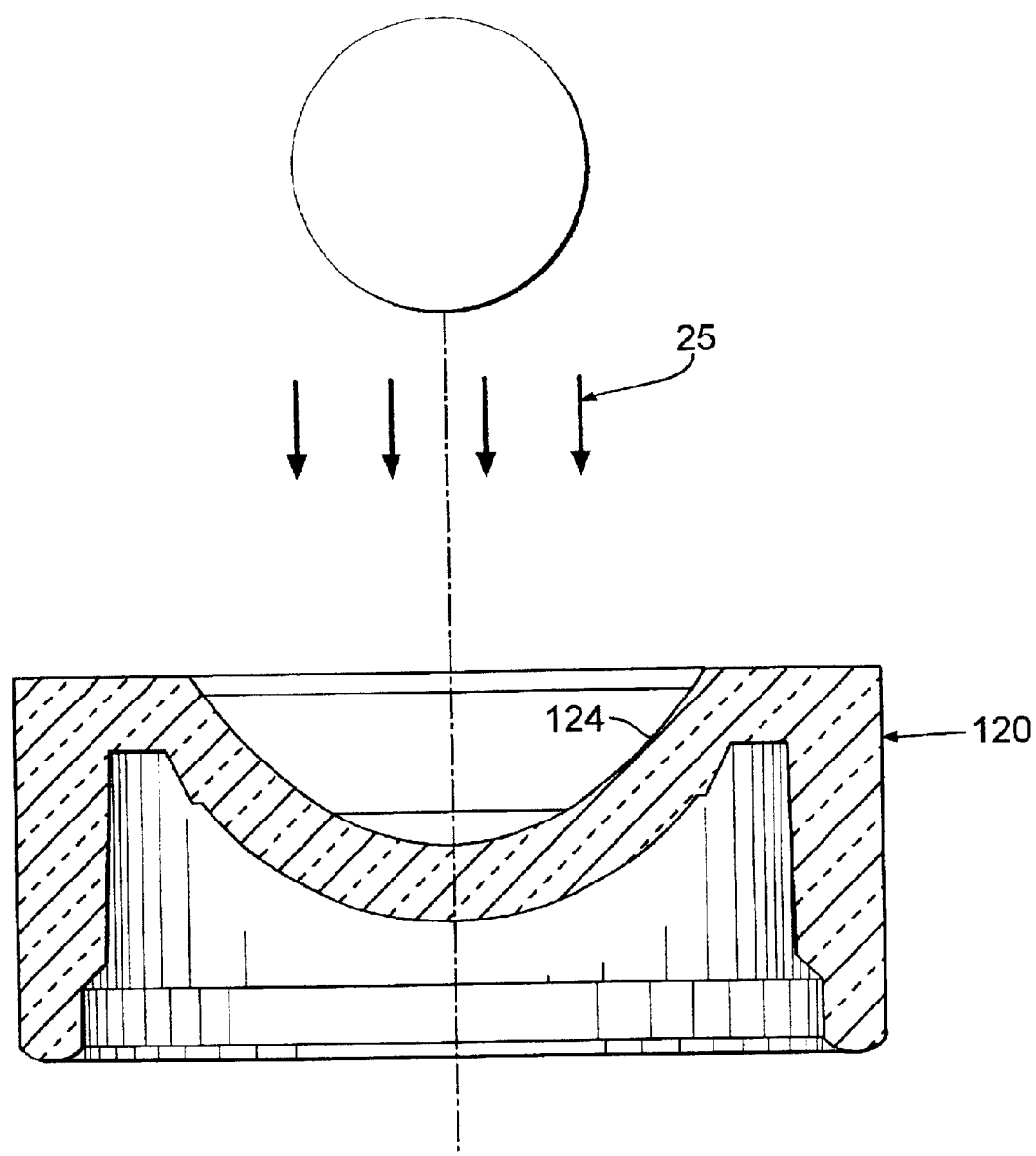
FIG. 4 is a cross-sectional elevational view of a posterior mold section showing the non-critical surface having a controlled radius of curvature.

One way to avoid "shadows" of uncured (or partially cured) lens-forming material is to control or remove the junction. This can be accomplished by molding the non-critical surface as a controlled surface or one that is formed without any junctions. An example is shown in FIG. 4. Rays 25 would not be impeded from passing through non-critical surface 124. Use of posterior mold 120 with non-critical surface 124 having a controlled surface as part of a contact lens mold assembly would produce improved lenses having a better cure profile. Non-critical surface 124 may be spherical or aspherical.

Figure 5:
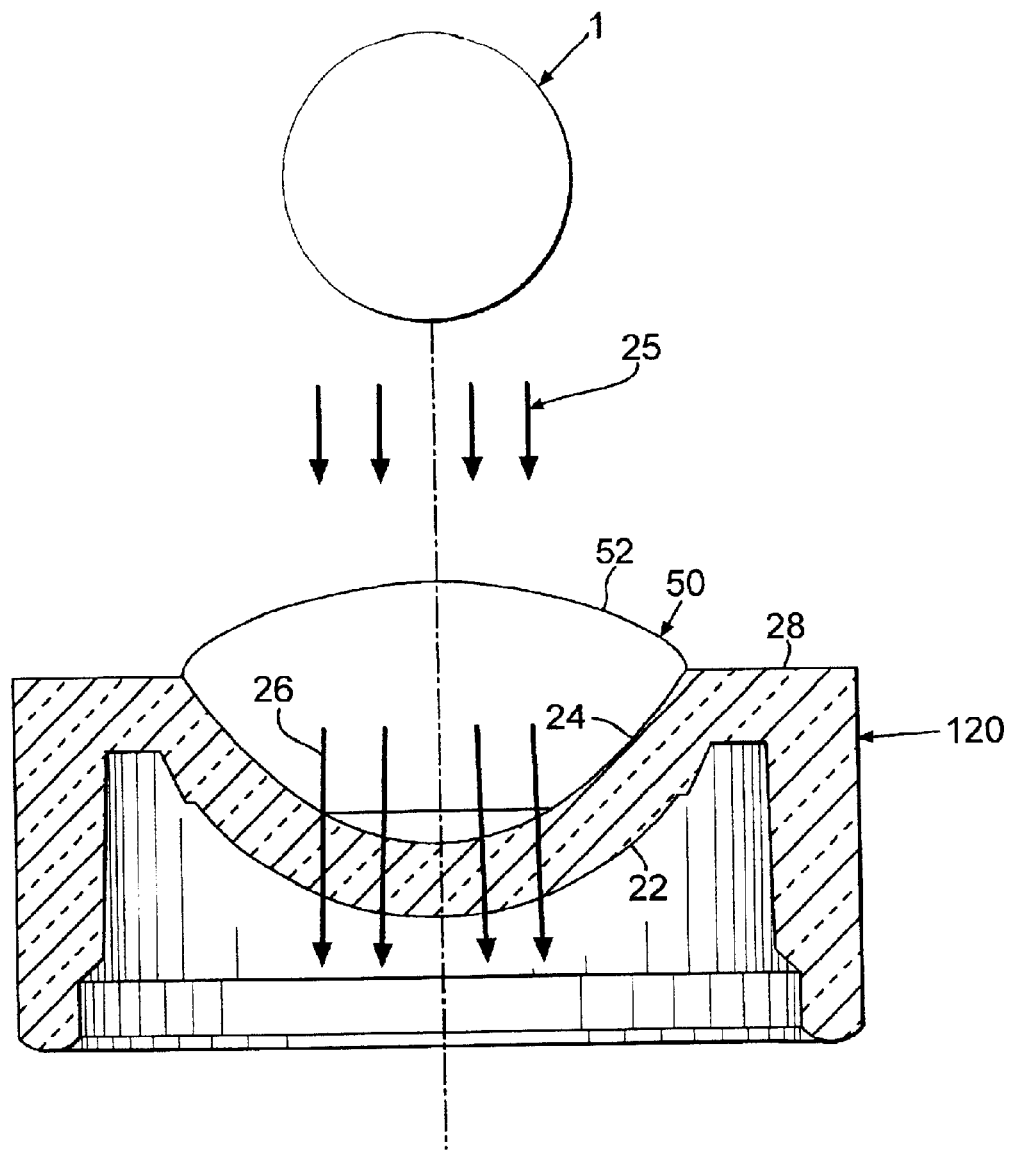
FIG. 5 is a cross-sectional elevational view of a posterior mold section showing the non-critical surface filled with a liquid.

FIG. 5 illustrates the neutralization of the optical effect of the posterior mold. This change is accomplished by the changing the way energy goes through mold 20. Concave surface 26 is formed by the non-critical surface 24. By placing a predetermined amount of liquid 50 in concave surface 26, the amount of reflection or refraction off of the non-critical surface 24 is reduced. The distribution of light rays emerging through lens-forming surface 22 is more even, resulting in a more controlled cure profile of cured lens 30. In the preferred embodiment, fluid 50 forms convex meniscus 52 with upper surface 28 of posterior mold 20. As shown, rays 25 from optical source 1 pass through liquid 50 and non-critical surface 24 in a parallel manner. The effects of any junctions (as previously in illustrated in FIG. 3) or any surface irregularities are negated. Stress in the resultant lens is reduced and the lens exhibits a controlled cure profile.

The use of liquids in this manner can also increase the effective intensity of irradiation rays reaching the monomer surface.

Figure 6:
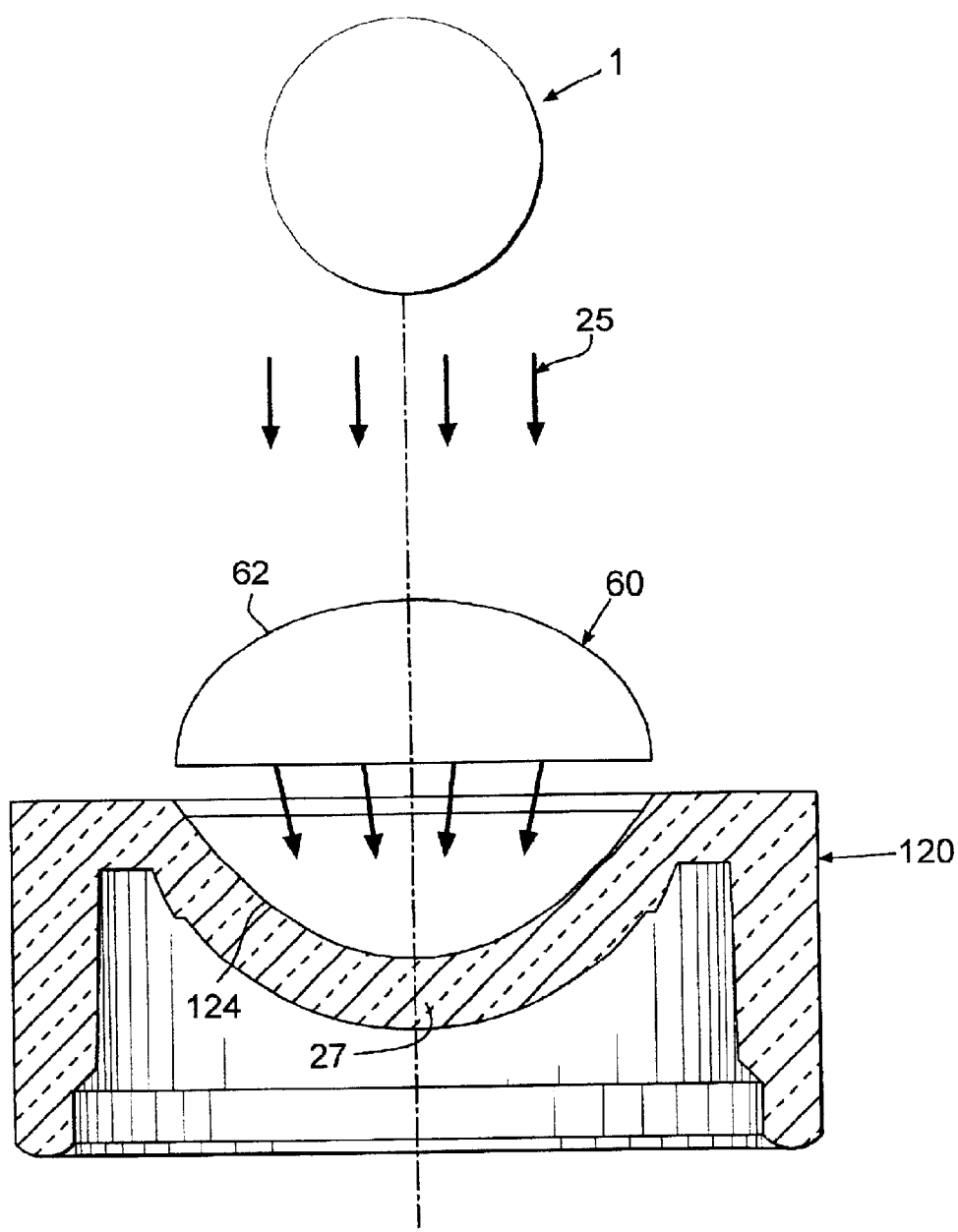
FIG. 6 is a cross-sectional elevational view of a posterior mold section showing light diffusion through a plano-back aspheric lens suspended above the posterior mold section.

In the preferred embodiment, the liquid used to fill concave surface 26 has a refractive index not substantially different than the mold material. Any liquid can be used. Especially preferred is water, glycerin or mixtures thereof Another embodiment of the invention is illustrated in FIG. 6. In this embodiment, an optical device made preferably from optical glass (i.e., free from internal strains, bubbles and other imperfections) is used to control the curing profile of the cast article.

By placing the optical device at a predetermined distance above the mold assembly, rays 25 from optical source 1 can be directed in a desired direction. Aberration, defined as a blurring and loss of clearness in an image, can also be limited by choosing the correct optical device. The optical device would converge the rays to a single focus point. For instance, a glass condenser lens 60 can shorten the focal length and cancel spherical aberration. Rays 25 pass through condenser lens 60 and concentrate the energy of the rays toward center 27 of mold 20. Although FIG. 6 shows the preferred embodiment (optical device 60 is an aspheric plano-back lens with the aspheric surface 62 toward optical source 1), optical device 60 may be inverted, having the aspheric surface 62 toward non-critical surface 124 of mold 120. Preferably, optical device 60 is positioned above mold assembly 5 and is held within a clamping device (mold assembly and clamping device not shown). Other embodiments are possible depending on the lens or lenses chosen. For instance, examples of aspheric condenser lenses include those with convex or concave backs. While the preferred embodiment is a simple or single lens of high magnification, compound lenses forming an optical system may be used to achieve the desired focal length and magnification. The compound lenses may include condensing or magnifying lenses or combination thereof An alternate embodiment is the use of a solid asymmetric convex lens or plug made from an amorphous material. The lens provides a uniform and magnified light source when inserted into the posterior mold cavity, i.e., adjacent to the non-critical surface of the posterior mold.

Figure 7:
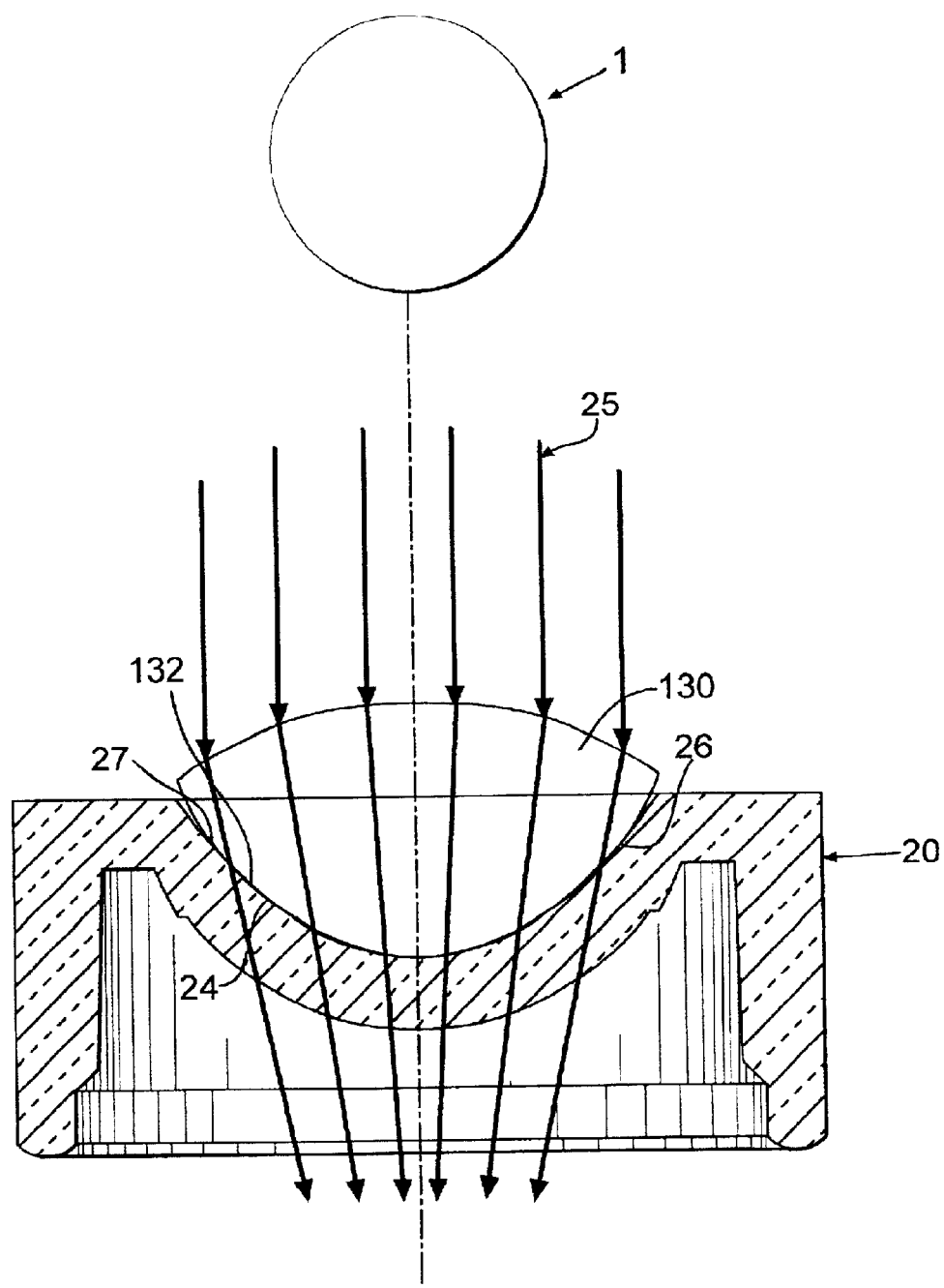
FIG. 7 is a cross-sectional elevational view of a posterior mold section showing light diffusion through an optical lens contained within the cavity of the posterior mold section.

As shown in FIG. 7, asymmetric convex plug 130 is inserted into concave surface 26 of posterior mold 20. Lens 130 converges rays 25 from optical source 1, which results in an increase of energy available to the lens-forming material (not shown). As seen in FIG. 7, it is not necessary for surface 132 of plug 130 to have an identical shape as non-critical surface 24. In fact, there may be a slight gap at periphery 27 of concave surface 26. Non-critical surface 24 may be a controlled surface as previously discussed or may have junctions present.

A preferred amorphous material includes Topas, an amorphous copolymer of ethylene and a cyclic olefin. Preferred are the following random copolymers:

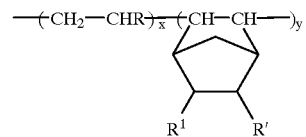

wherein R is hydrogen or C1–C4 alkyl, preferably hydrogen;

Each R' is independently hydrogen or C1–C4 alkyl, preferably hydrogen or methyl; and X and y are at least 1.

These materials are available from Hoechst Celanese Corporation, Summit, New Jersey, USA and the lens is typically lathed.

Topas is well adapted for UV curing processes. As an example, this copolymer has very high light transmissibility. Therefore, for curing operations employing irradiation-induced polymerization, the higher transmissibility of the plug material permits a more efficient curing process. Topas was the subject of prior application U.S. Ser. No. 09/260860 (Ruscio, assigned to Bausch & Lomb Incorporated) wherein the material was disclosed as a molding material.

In an alternate embodiment, one may choose to introduce predetermined stress profiles to a lens, rather than remove them. In a specific instance, it may be desirable to form a lens having a specific shape which would alter the fitting of the lens to the eye, such as increasing the lens movement when worn on the eye. A specific parameter which could be stress-induced is edge lift which causes the edge of the lens to be slightly raised off the eye. Inducing stress to a lens can be performed by altering the parameters of the optical devices altering the irradiation pathway.

The following examples serve to illustrate the use of optical devices to affect the cure profile (i.e., SAG measurements) of an ophthalmic lens formed in a mold assembly.

EXAMPLE 1

A series of HEMA lenses was cast molded using posterior and anterior molds made from a non-UV stabilized PVC resin. The posterior mold concave surface of lot 2 was filled with glycerol; the posterior mold concave surface of lot 3 was filled with water. After casting, the mold assemblies were separated and lenses were hydrated and measured. Each lot had five lenses.

TABLE 1

| Lot # | SAG (mm) |
|---|---|
| 1 (control) | 3.018 |
| 2 | 3.596 |
| 3 | 3.600 |

Lenses made with water or glycerol in the posterior cavity showed an increased SAG measurement when compared to the control lenses. The lots with increased SAG measurements showed a decrease in the number of lenses exhibiting dimpling.

EXAMPLE 2

A series of HEMA lenses was cast molded using posterior and anterior molds made from a non-UV stabilized PVC resin. The mold assemblies were separated and lenses were hydrated and measured. Lot 1 had 89 lenses, Lot 2 had 69 and Lot 3 had 27. Lot 3 had a controlled non-critical surface (no junctions present). A 58.8D magnifier lens was used as the optical lens.

TABLE 2

| Lot No. | Non-Critical Surface Posterior Mold | Clamp Plate Treatment | Power of Contact Lens | Average SAG |
|---|---|---|---|---|
| 1 (control) | Standard Surface, Bevel | No condensing lens | −6 | 3.298 |
| 2 | Optical Quality Surface, Bevel | 58.8D condensing lens | −6 | 3.372 |
| 3 | Controlled curve | 58.8D condensing lens | −6 | 3.451 |

The lenses cured with a magnifying lens showed an increase in SAG measurements as compared to the control lenses (lot 1).

EXAMPLE 3

A series of HEMA lenses was cast molded using posterior and anterior molds made from a non-UV stabilized PVC resin. The mold assemblies were separated and lenses were hydrated and measured. Each lot had 5 lenses. Lot 1 was a control lot. An asymmetric convex plug having a power of 117D made of Topas was inserted into the posterior concave surface of lot 2. The surface of the plug toward the optical source had a radius of 7.00 mm and the surface of the plug facing the non-critical surface of the mold had a radius of 8.5 mm. The SAG of the plug was 4.68 mm.

TABLE 3

| Lot No. | SAG (average) |
|---|---|
| 1 (control) | 3.534 |
| 2 | 3.658 |

The lenses made using an asymmetric convex plug made of Topas inserted showed an increase in SAG measurement and a lower incidence of dimpling. Overall, improved lenses were produced using the Topas insert.

What is claimed is:

1. A method of casting an ophthalmic lens within a mold assembly, said assembly comprised of first and second mold portions, said first mold portion comprised of an amorphous material and having first and second opposing surfaces, said first surface comprised of a concave surface and said second surface comprising an optical lens-forming surface, said second mold having first and second opposing surfaces, said first surface comprising an optical lens-forming surface, said method comprising the steps of:
   a) charging said first surface of said second mold portion with a polymerizable monomer;
   b) assembling said mold portions such that said polymerizable monomer is sandwiched between said lens-forming surface of said first mold portion and said first surface of said second mold portion;
   c) neutralizing substantially all negative power of said first mold portion while maintaining said first surface concave; and
   d) irradiating said mold assembly such that the pathway of said radiation passes through said cavity of said first mold portion;
   whereby said pathway of said radiation is controlled such that said monomer is cast having a specific cure profile.

2. The method of claim 1, wherein said neutralizing step comprises placing a liquid into the concave surface of said first mold wherethrough said radiation passes.

3. The method of claim 1, wherein said neutralizing step comprises controlling the radius of said concave surface of first mold portion wherethrough said radiation passes.

4. The method of claim 1, wherein said neutralizing step comprises placing an optical lens above said concave surface of said first mold portion wherethrough said radiation passes.

5. The method of claim 1, wherein said neutralizing step comprises placing an optical lens in said concave surface of said first mold portion wherethrough said radiation passes.

6. The method of claim 1 wherein said concave surface of said first surface of said first mold portion is spherical or aspherical.

7. The method of claim 1, wherein said first mold portion comprises polyvinyl chloride.

8. The method of claim 1, wherein said first mold portion comprises polystyrene.

9. The method of claim 1, wherein said ophthalmic lens is a soft contact lens.

10. The method of claim 1, wherein said ophthalmic lens is an intraocular lens.

11. The method of claim 1, wherein said ophthalmic lens is a corneal onlay.

12. The method of claim 1, wherein said ophthalmic lens is a corneal inlay.

13. A method of casting an ophthalmic lens within a mold assembly, said assembly comprised of first and second mold portions, said first mold portion comprised of an amorphous material and having first and second opposing surfaces, said first surface comprised of a concave surface and said second surface comprising an optical lens-forming surface, said second mold having first and second opposing surfaces, said first surface comprising an optical lens-forming surface, said method comprising the steps of:

a) charging said first surface of said second mold portion with a polymerizable monomer;

b) assembling said mold portions such that said polymerizable monomer is sandwiched between said lens-forming surface of said first mold portion and said first surface of said second mold portion;

c) filling said concave surface of said first mold portion with a liquid; and d) irradiating said mold assembly such that said radiation passes through said liquid contained in said concave surface of said first mold portion;

whereby said pathway of said radiation is controlled such that said monomer is cast having a specific cure profile.

14. The method of claim 13, wherein said liquid has a refractive index not substantially different to said first mold portion.

15. The method of claim 13, wherein said liquid is water.

16. The method of claim 13, wherein said liquid is glycerin.

17. The method of claim 13, wherein said liquid is a mixture of water and glycerin.

18. The method of claim 4, wherein said optical lens is a positive lens.

19. The method of claim 4, wherein said optical lens is a plano convex lens.

20. A method of casting an ophthalmic lens within a mold assembly, said assembly comprised of first and second mold portions, said first mold portion comprised of an amorphous material and having first and second opposing surfaces, said first surface comprised of a concave surface and said second surface comprising an optical lens-forming surface, said second mold having first and second opposing surfaces, said first surface comprising an optical lens-forming surface, said method comprising the steps of:

a) charging said first surface of said second mold portion with a polymerizable monomer;

b) assembling said mold portions such that said polymerizable monomer is sandwiched between said lens-forming surface of said first mold portion and said first surface of said second mold portion;

c) placing a optical lens into said concave surface of said first mold portion; and d) irradiating said mold assembly such that said radiation path passes through said optical lens and said concave surface of said first mold portion; whereby said pathway of said radiation is controlled such that said monomer is cast having a specific cure profile.

21. The method of claim 20, wherein said radiation path is altered by said optical lens and said ophthalmic lens is exposed to similar amounts of radiation energy.

22. The method of claim 20, wherein said optical lens comprises an amorphous material.

23. The method of claim 20, wherein said optical lens comprises a cyclic olefin.

* * * * *